Patented Mar. 1, 1932                                          1,847,596

UNITED STATES PATENT OFFICE

THOMAS W. CAVERS AND GEORGE M. LEE, OF ANYOX, BRITISH COLUMBIA, CANADA

ART OF SINTERING ORE FINES, FLUE DUST, SULPHIDE, OR OTHER CONCENTRATES

No Drawing.   Application filed November 26, 1928. Serial No. 322,083.

This invention relates to a method of preparing ores unsuitable for the process of sintering, to render them more amenable to that process.

It is old in the art to sinter ore fines, flue dust, etc., to produce hard lumps of a size suitable for treatment in a blast furnace but the usual process fails where the acidic and basic constituents that go to produce the binder are not balanced in a metallurgical sense, which condition is overcome by the present invention.

One object of the invention is to produce a sinter having sufficient strength to withstand crushing in a blast furnace, from material that would not produce sinter of that nature when prepared and treated in the ordinary manner on a sintering machine.

Another object is to produce a blast furnace charge of proper form for blasting.

A further object is to eliminate much expense and annoyances commonly experienced in sintering practice.

Further objects will be apparent from the following disclosure and claims.

In the art of sintering the object of the operation is to produce more or less solid and coherent portions of a size suitable for blast furnace feed, from the fine pulverulent material and, in case of sulphides, to produce a partial desulphurization of the sintering charge.

This is accomplished by igniting, by any convenient method, the fine material contained in a suitable mechanism or apparatus, and causing air to be passed through the ignited mass. Thermal and chemical reactions are thereby promoted throughout the mass, resulting in incipient fusion and partial slagging of certain ingredients of the charge and the partially slagged portions act as a binder, causing the fine particles to cohere in larger and more or less solid lumps. The values present in the ore do not, however, enter into the slagging reactions, to any substantial extent.

However, in many cases the slag-forming portion of the charge to be sintered is of such a nature that its fusion is possible only at temperatures above that obtaining in the sintering process, consequently, no binder for the mass is formed.

Also, in many cases the constituents of the charge to be sintered did not furnish in proper quantity the easily fusible portions necessary as a binder.

The natural gangue of the ore material may be too acid or too basic to have a fusion point within the temperature range of the operation.

We have found that a satisfactory binder may be produced by adding to, and thoroughly mixing with, the charge to be sintered, more or less finely divided, acid or basic material, according to the ratio of basic and acid constituents available as binder-forming material in the charge and in quantity such that the binder is not difficultly fusible.

Usually there is sufficient binder formed in the above manner but when the acid constituent is low, both acid and basic material are found necessary and they are accordingly mixed with the charge before sintering.

In the calculation the iron compounds such as sulphides and oxides should be ignored as these do not play any important part in producing the binder owing to the comparatively low temperature at which the process is carried on. This is an important consideration and should not be ignored.

As instances of how our invention may be practiced, three typical examples are given.

*Example 1*

In a sample of ore fines to be sintered the acid component was found to be 10% and consisted mainly of $SiO_2$. The basic components consisted mainly of CaO and MgO and totaled 4%. To this was added enough limestone to bring the total sum of basic constituents to just over 5%, or one half of the acid component.

*Example 2*

The $SiO_2$ was found to be 6% and the CaO and MgO totaled 5%. In this case $SiO_2$ was added to bring the total to between 9% and 10%.

*Example 3*

The $SiO_2$ was found to be 6% and the $CaO$ plus $MgO$ was 3%. This should produce an easily fusible binder but the quantity was not great enough to hold together the mass. In this case siliceous material was added to bring the $SiO_2$ to 10% and limestone to bring the sum of the $CaO$ and $MgO$ to 5%.

In Example 1 other basic material such as dolomite, saltcake, nitrecake, salt and the like might be added instead of limestone. Any highly siliceous material that is not too refractory may be used instead of quartz. In any case the added material should be apportioned according to its nature in the correct amounts to form the desired binder.

In any given instance the sum of the $MgO$ and $CaO$, which are typical basic components, should not be less than 50% of the $SiO_2$, which is the usual acid component, nor more than 60%.

It is to be understood that we do not wish to be limited to the specific procedure disclosed except as shown by the appended claims.

We claim:

1. A process for preparing finely divided ore bearing material containing a metal for sintering, which comprises determining the quantities of acidic and basic gangue material in said ore not directly combined with the metal of said ore and adding material to the ore to bring the ratio of $SiO_2$ to $CaO$ and $MgO$ to about 2:1, and heating to effect combination of the silica with the lime and magnesia, such heating being too low to cause any considerable amount of reaction between $Fe_2O_3$ and $SiO_2$.

2. A process for sintering finely divided ore bearing material which comprises determining the amounts of acidic and basic gangue in said ore bearing fluxing material and adding a material to balance the gangue so that the basic components thereof should be not less than 50 per cent nor more than 60 per cent of the acidic components thereof, the total amount of said acidic and basic material and fluxing material being not substantially below 9% of the total, and thereafter heating sufficiently to cause the said acidic and basic materials to react without substantially altering the metalliferous constituents of said ore bearing material.

In testimony whereof we affix our signatures.

THOMAS WILLARD CAVERS.
GEORGE McCRORY LEE.